(12) United States Patent
Yu et al.

(10) Patent No.: US 11,336,874 B2
(45) Date of Patent: May 17, 2022

(54) IMAGE DISPLAY METHOD AND APPARATUS, AND PROJECTION DEVICE

(71) Applicant: Appotronics Corporation Limited, Shenzhen (CN)

(72) Inventors: Xin Yu, Shenzhen (CN); Chao Wu, Shenzhen (CN); Fei Hu, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 17/278,517

(22) PCT Filed: May 15, 2019

(86) PCT No.: PCT/CN2019/086926
§ 371 (c)(1),
(2) Date: Mar. 22, 2021

(87) PCT Pub. No.: WO2020/057151
PCT Pub. Date: Mar. 26, 2020

(65) Prior Publication Data
US 2022/0038666 A1 Feb. 3, 2022

(30) Foreign Application Priority Data
Sep. 21, 2018 (CN) .......................... 201811109860.3

(51) Int. Cl.
*H04N 9/31* (2006.01)

(52) U.S. Cl.
CPC ......... *H04N 9/3152* (2013.01); *H04N 9/3105* (2013.01); *H04N 9/3158* (2013.01); *H04N 9/3161* (2013.01); *H04N 9/3164* (2013.01)

(58) Field of Classification Search
CPC .. H04N 9/3155; H04N 9/3158; H04N 9/3105; H04N 9/3164; H04N 9/3161; H04N 9/31; H04N 9/3152
(Continued)

(56) References Cited

U.S. PATENT DOCUMENTS

2007/0046898 A1 3/2007 Conner
2018/0007327 A1 1/2018 Richards
(Continued)

FOREIGN PATENT DOCUMENTS

CN 101278558 A 10/2008
CN 101364033 A 2/2009
(Continued)

OTHER PUBLICATIONS

Chinese Office Action dated Mar. 10, 2021, Application No. 2018111098603.
(Continued)

*Primary Examiner* — Sherrie Hsia
(74) *Attorney, Agent, or Firm* — The Dobrusin Law Firm, PC

(57) ABSTRACT

An image display method includes according to image information of a current image frame to be displayed, adjusting the brightness of a first light source (11) having a first light field, and steering light of a second light source (12) to form a second light field, so as to enable the first light field provided by the second light source (11) and the second light field provided by the second light source (12) to work in concert to satisfy displaying of display partitions of the image frame to be displayed. The image display method implements high-dynamic range display of images, and facilitates improvement of dark field detail expression of images to be displayed. Also provided are an image display apparatus and a projection device.

19 Claims, 8 Drawing Sheets

(58) Field of Classification Search
USPC .......................... 348/739, 744; 345/690, 83
See application file for complete search history.

(56) References Cited

U.S. PATENT DOCUMENTS

2018/0048873 A1    2/2018  Damberg
2021/0341825 A1*  11/2021  Yu ..................... G03B 21/2053

FOREIGN PATENT DOCUMENTS

| | | |
|---|---|---|
| CN | 101887692 A | 11/2010 |
| CN | 103559865 A | 2/2014 |
| CN | 104882097 A | 9/2015 |
| CN | 105573032 A | 5/2016 |
| WO | 2017038000 A2 | 3/2017 |
| WO | 2018010467 A1 | 1/2018 |

OTHER PUBLICATIONS

Search Report dated Aug. 21, 2019, Application No. PCT/CN2019/086926.
European Supplementary Search Report dated Mar. 23, 2022, Application No. 19861832.4.

* cited by examiner

IMAGE DISPLAY METHOD AND APPARATUS, AND PROJECTION DEVICE

TECHNICAL FIELD

The present disclosure relates to the field of projection technology, and particularly to an image display method, an image display apparatus, and a projection device.

BACKGROUND

In the application technology of realizing high dynamic range display by projection device, there is a technical solution, in which a projection device with a high dynamic range display uses light steering of a part of light to realize 70% of light of light source of the projection device is directly provided to a digital micromirror spatial light modulator, and 30% of the light of the light source is provided to the silicon-based liquid crystal chip which steers the light irradiating thereon, and then is irradiated to the digital micromirror spatial light modulator, thereby increasing a local brightness of a projection image. This technology can increase a peak brightness of the projection image and increase the gradation and brightness of a bright field part. However, a dark field of the projection image is still bright, and the detail expression of the dark field of the projection image is poor.

SUMMARY

In order to solve the technical problem of the existing projection device that the detail expression of the dark field of the projection image is poor when reaching the high dynamic range display effect, the present disclosure provides an image display method, an image display apparatus, and a projection device.

In a first aspect, the present disclosure provides an image displaying method, and the method includes:

acquiring image information of an image frame to be displayed, wherein the image frame to be displayed includes a plurality of display partitions; and based on the image information of the image frame to be displayed, adjusting brightness of a first light source having a first light field, and performing light steering on a second light source to form a second light field, so as to enable the first light field provided by the first light source and the second light field provided by the second light source to cooperate to satisfy displaying of each of the plurality of display partitions of the image frame to be displayed.

In a second aspect, the present disclosure provides an image display apparatus, and the image display apparatus includes a first light source and a second light source. Brightness of the first light source can be adjusted according to image information of an image frame to be displayed and brightness of the second light source. The second light source includes a light steering module configured to performing light steering on the second light source according to the image information of the image frame to be displayed to form a second light field, such that a first light field provided by the first light source and the second light field provided by the second light source cooperate to satisfy displaying of each of a plurality of display partitions of the image frame to be displayed. The image frame to be displayed are divided into the plurality of display partitions in such a manner to match the light steering module of the second light source.

In a third aspect, the present disclosure provides a projection device. The projection device includes the image display apparatus described above and a light combiner. The light combiner is configured to steer the first light field of the first light source and the second light field of the second light source that formed according to the above image displaying method, to a same light path to propagate to obtain composite illumination light.

Compared with the prior art, in the image display method, the image display apparatus, and the projection device, according to the acquired image information of the image frame to be displayed, the brightness of the first light source is adjusted to obtain the first light field, light steering is performed on the second light source to obtain the second light field, and the first light field provided by the first light source and the second light field provided by the second light source cooperate to satisfy displaying of each of the plurality of display partitions of the image frame to be displayed. Satisfying the displaying of each of the plurality of display partitions of the image frame to be displayed can be satisfying the display brightness of each of the plurality of display partitions of the image frame to be displayed, or can be satisfying the display brightness of each of the plurality of display partitions of the image frame to be displayed in a specific brightness. Since the first light source and the second light source that are relatively independent from each other cooperate to provide the brightness, the brightness provided by the first light source and/or the brightness provided by the second light source can be selectively adjusted according to the image information of the image frame to be displayed, which can reasonably save energy, provide image display light of the specific brightness, relatively increase the provided brightness range, realize the display of high dynamic range images, and also improve the detail expression of the dark field of the image to be displayed.

DESCRIPTION OF CHARACTER NUMERALS OF PRIMARY ELEMENTS

Figure 1:
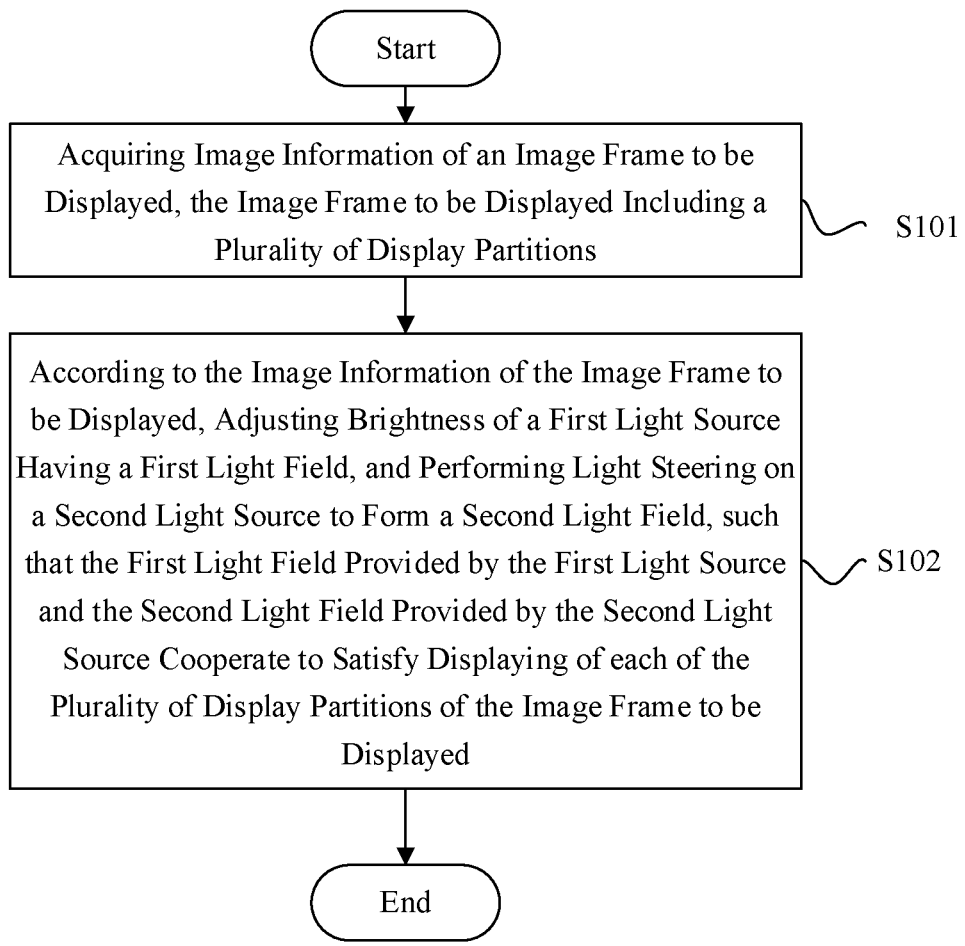
FIG. 1 is a flowchart of an image display method provided by a first embodiment of the present disclosure.

Image display apparatus 10;
Light steering module 121;

Projection device 100, 200, 300, 400;
First light source 11, 101a, 201a, 301a;
Light homogenization device 102, 202, 302;
Mirror 103, 203, 305;
Phosphor color wheel 206, 303;
Polarization conversion system 304;
Second light source 12, 101b, 201b;
Red laser 306a;
Green laser 306b;
Blue laser 306c;
Red-light light source system 401a;
Green-light light source system 401b;
Blue-light light source system 401c;
Light steering device 104, 204, 307;
Light combiner 105, 205, 308;
Spatial light modulator 106, 207, 309, 402;
Projection lens 107, 208, 310, 403.

The following specific embodiments will further illustrate the present disclosure in conjunction with the above drawings.

DESCRIPTION OF EMBODIMENTS

Please refer to FIG. 1, FIG. 1 is a flowchart of an image display method provided by a first embodiment of the present disclosure. The image display method can be used in an image display apparatus and a projection device including the image display apparatus, such as a cinema machines, laser televisions, engineering machines, business and education machines, wall splicing device, and micro-projection devices.

The image display method of the present embodiment can be applied in the image display apparatus. The image display apparatus includes a first light source and a second light source, and is configured to provide a specific brightness by means of the cooperation of the first light source and the second light source. As shown in FIG. 1, the image display method of the present embodiment can include the following steps.

At step S101, image information of an image frame to be displayed is acquired, wherein the image frame to be displayed includes a plurality of display partitions.

In the present embodiment, the display partitions are obtained by performing partition dividing in a preset dividing manner on the image frame to be displayed. The preset dividing manner can be a way with which the image frame to be displayed is divided, according to division setting data, into a preset number of rectangle regions having a same size. Or, the preset dividing manner can be a way with which the image frame to be displayed is divided, in a default manner, into a default number of rectangle regions having a same size. Of course, in addition to the rectangular shape, the shape of the divided region can also be other shapes such as a circle and a regular hexagon. The division setting data can be default setting data, or manual setting data used for obtaining a preset number of display partitions.

It can be understood that the image frame to be displayed is an image that the image display apparatus currently needs to display or a projection device needs to project.

It can be understood that the image information is data that can represent the color and/or brightness of pixels in the image.

At step S102, based on the image information of the image frame to be displayed, brightness of a first light source having a first light field is adjusted, and a light steering is performed on a second light source to form a second light field, such that the first light field provided by the first light source and the second light field provided by the second light source to cooperate to satisfy a displaying of each display partition of the image frame to be displayed.

In the present embodiment, the adjustment based on the image information of the image frame to be displayed has the following implementable manners:

1) the power of the first light source is adjusted, such that the brightness of the first light field emitted by the first light source satisfies a set brightness condition;

2) the light steering is performed on the second light source such that the light distribution of the second light field formed by the second light source satisfies the brightness distribution of each of the plurality of display partitions;

3) the first light source and the second light source are adjusted respectively, such that the first light field provided by the first light source and the second light field of the second light source can be cooperated to satisfy the display of each of the plurality of display partitions of the image frame to be displayed.

Corresponding to the implementable manner 1), the cooperation of satisfying the display of each of the plurality of display partitions of the image frame to be displayed is that the brightness of the first light field provided by the first light source satisfies the set brightness condition, that is the display of each display partition of the image frame to be displayed is satisfied, thus there is no need to adjust the second light source or even to turn on the second light source.

Corresponding to the implementable manner 2), the cooperation of satisfying the displaying of each display partition of the image frame to be displayed is that the light distribution of the second light field formed by modulating the light provided by the second light source satisfies the brightness distribution of each display partition, thus there is no need to adjust the first light source or even to turn on the first light source.

Corresponding to the implementable manner 3), the cooperation of satisfying the displaying of each display partition of the image frame to be displayed is that the brightness of the first light source and the brightness of the second light source are dynamically adjusted respectively such that the cooperation the first light field of the first light source and the second light field of the second light source properly satisfies the display of each display partition of the image frame to be displayed.

In the present embodiment, with the acquired image information of the image frame to be displayed, the brightness of the first light source is adjusted to obtain the first light field, and the same time, the light steering is performed on the second light source to obtain the second light field, and the adjusted first light source and the second light source cooperate to satisfy the display of each display partition of the image frame to be displayed. The display to be satisfied of each display partition of the image frame to be displayed can be capable of satisfying the display brightness of each display partition of the image frame to be displayed, or can be capable of satisfying the display brightness of each display partition of the image frame to be displayed in a specific brightness. Since the first light source and the second light source that are relatively independent from each other can be cooperated to provide the brightness, the brightness provided by the first light source and/or the brightness provided by the second light source can be selectively adjusted according to the image information of the image frame to be displayed, which can reasonably save energy, provide image display light of the specific brightness, relatively increase the provided brightness range, realize the display of high dynamic range images, and also improve the detail expression of dark field of the image to be displayed.

In the present embodiment, for example, the brightness provided by the first light source and/or the brightness of the second light source may cooperate to restore the brightness of each display partition of the image frame to be displayed.

In a specific application example of the present embodiment, the first light source can be used for providing the background brightness of each display partition of the image frame to be displayed, and the second light source can be used for providing the brightness of the high-brightness display partition among the display partitions, thereby realizing the brightness cooperation of the first light source and the second light source. Herein, the first light source can be an adjustable light source, so the brightness provided by the first light source can be high or low; the second light source can be a light source with constant brightness, and a light steering is performed, by a light steering device, on the illumination light provided by the second light source to form the second light field corresponding to the position and brightness of each high-brightness display partition. Based on this, since the brightness provided by the first light source can be lower, it is beneficial to obtain the global dimming effect, and the light field formed by light steering of the light steering device can increase the peak brightness of the display image, thereby increasing the intra-frame contrast and achieving better image display effect in the high dynamic range. At the same time, since the brightness required by the first light source is reduced, the power of the first light source can be relatively reduced, which saves energy.

In a specific application example of the present embodiment, the brightness of the second light source can has a maximum brightness value that the second light source can provide or a preset brightness value. The preset brightness value can be a brightness value obtained by data statistics and/or experience, which can prolong the working life of the second light source.

Figure 2:
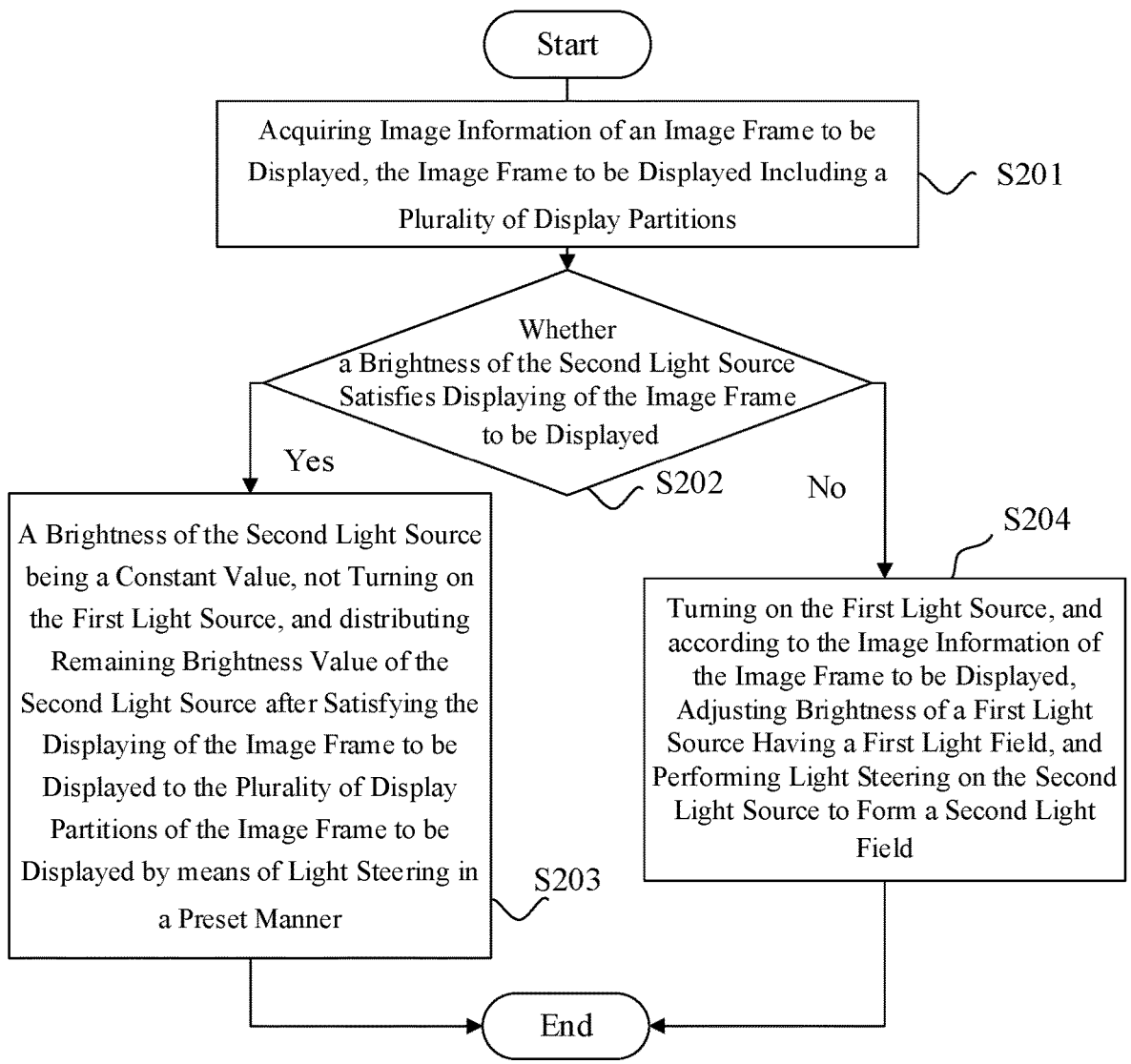
FIG. 2 is a flowchart of an image display method provided by a second embodiment of the present disclosure.

Please refer to FIG. 2, FIG. 2 is a flowchart of an image display method provided by a second embodiment of the present disclosure. The main difference between the present embodiment and the first embodiment is that the present embodiment includes steps, such as a step of determining whether the brightness of the second light source satisfies the display of the image frame to be displayed. It should be noted that, within the scope of the spirit or basic features of the present disclosure, the specific solutions applicable to the first embodiment can also be correspondingly applied to the present embodiment, which is no longer repeated herein for saving space and avoiding repetition.

The image display method shown in FIG. 2 can be applied to a projection apparatus and a projection device including the projection apparatus. As shown in FIG. 2, the image display method can include the following steps.

At step S201, image information of an image frame to be displayed is acquired, where the image frame to be displayed includes a plurality of display partitions.

At step S202, it is determined whether brightness of the second light source satisfies displaying of the image frame to be displayed.

In the present embodiment, if the brightness of the second light source can satisfy the displaying of the image frame to be displayed, step S203 is executed, otherwise, step S204 is executed.

In the present embodiment, when the brightness provided by the second light source can meet a set brightness or restore the brightness of the image frame to be displayed, it can be regarded that the brightness of the second light source can satisfy the displaying of the image frame to be displayed.

At step S203, the brightness of the second light source is a constant value, the first light source is not turned on and light steering is performed in a preset manner so as to distribute a remaining brightness value of the second light source after satisfying the displaying of the image frame to be displayed to the plurality of display partitions of the image frame to be displayed.

In the present embodiment, the power of the second light source is not adjustable, so the brightness provided by the second light source is a constant value. Correspondingly, the brightness range of each display partition after the light steering is relatively fixed, and the maximum brightness value is also a relatively constant value.

It can be understood that when the brightness of the second light source can satisfy the displaying of the image frame to be displayed, there can be a situation that the brightness provided by the second light source is higher than the brightness requirement of the image frame to be displayed. Therefore, after the display brightness of the image frame to be displayed is satisfied by the provided brightness, light steering is performed in a preset manner on the remaining brightness, such that the brightness is distributed to the plurality of display partitions. Herein, the preset manner can be an equal distribution of brightness, or other distribution manners.

At step S204, the brightness of the second light source is a constant value, the first light source is turned on, and according to the image information of the image frame to be displayed, the brightness of the first light source having the first light field is adjusted and light steering is performed on the second light source to form the second light field.

In the present embodiment, after the first light source is turned on, the power of the first light source can be adjusted, such that the brightness provided by the first light source can be adjusted to cooperate the brightness of the second light source to satisfy the display brightness of each display partition of the image frame to be displayed. Of course, the brightness of the second light source can also be a variable value, so the first light source and the second light source can be adjusted to an assigned brightness at the same time, or any one of the light sources can be adjusted to the assigned brightness first, and then the other one of the light sources can be adjusted to the assigned brightness.

In the present embodiment, after acquiring the image information of the image frame to be displayed, it is determined whether the brightness of the second light source can satisfy the display brightness of the image frame to be displayed. If the brightness of the second light source can satisfy the display brightness of the image frame to be displayed, the first light source is not turned on; if not, the first light source is turned on to provide the corresponding brightness, such that the first light source can be turned on purposefully according to the image information of the image frame to be displayed to satisfy the display brightness of the image frame to be displayed, and at the same time it reduces energy consumption.

Figure 3:
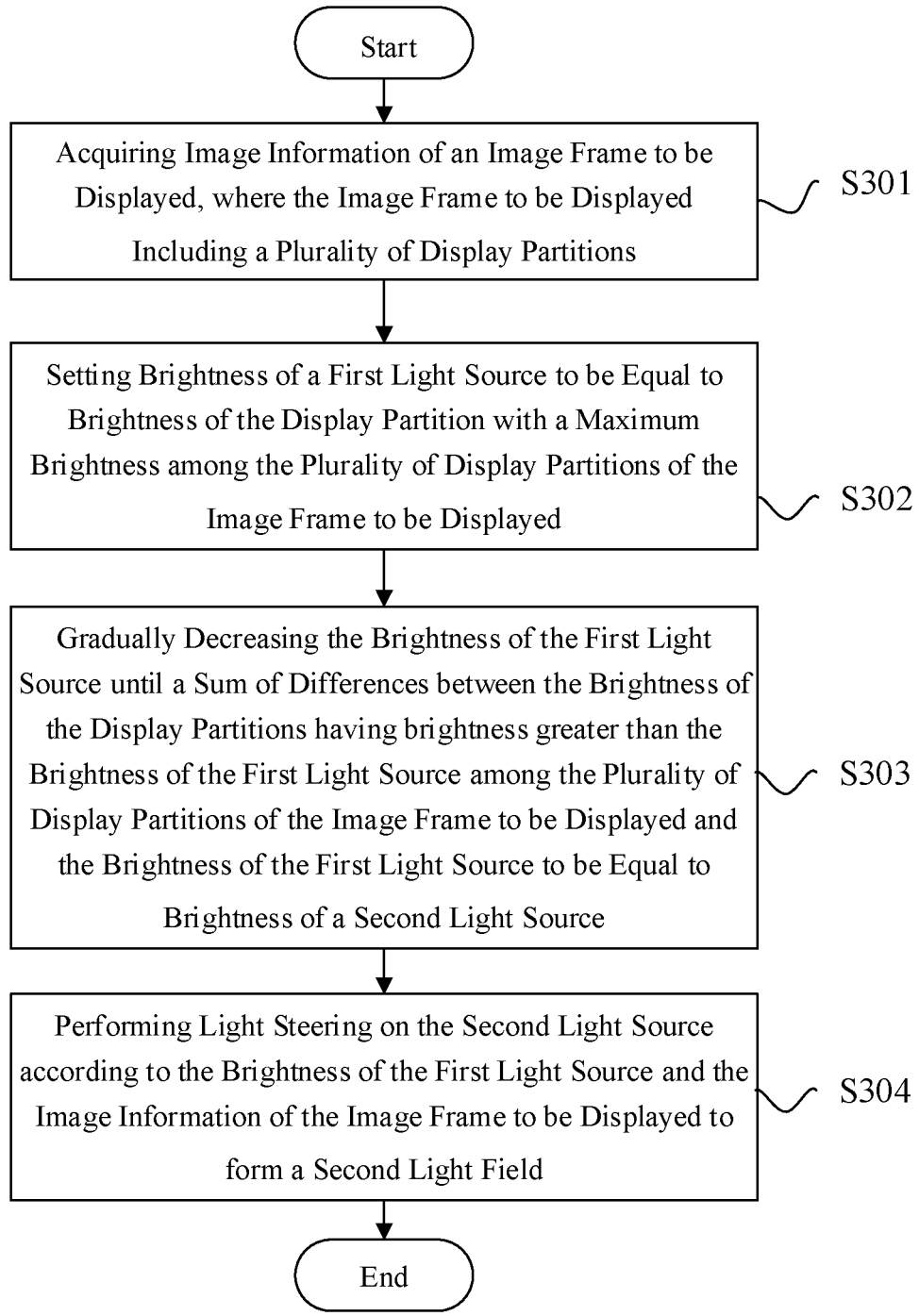
FIG. 3 is a flowchart of an image display method provided by a third embodiment of the present disclosure.

Please refer to FIG. 3, FIG. 3 is a flowchart of an image display method provided by a third embodiment of the present disclosure. The main difference between the present embodiment and the foregoing embodiments is that the present embodiment includes steps, such as a step of determining whether the brightness of the first light source is equal to the brightness of the display partition having a maximum brightness in the image frame to be displayed. It should be noted that, within the scope of the spirit or basic features of the present disclosure, the specific solutions applicable to the first embodiment can also be correspondingly applied to the present embodiment, which is no longer repeated here for saving space and avoiding repetition.

The image display method shown in FIG. 3 can be applied to a projection apparatus and a projection device including the projection apparatus. As shown in FIG. 3, the image display method can include the following steps.

At step S301, image information of an image frame to be displayed is acquired, where the image frame to be displayed includes a plurality of display partitions.

It can be understood that the image information of the image frame to be displayed can include the brightness information of each display partition.

It can be understood that the display partitions are partitions obtained by performing partition dividing in a preset dividing manner on the image frame to be displayed. The preset dividing manner can be a way with which the image frame to be displayed is divided, according to division setting data, into a preset number of rectangle regions having a same size. Or, the preset dividing manner can be a way with which the image frame to be displayed is divided, in a default manner, into a default number of rectangle regions having a same size. Of course, according to different display requirements, in addition to the rectangular shape, the shape of the divided region can also be other shapes such as a circle and a regular hexagon. The division setting data can be default setting data, or manual setting data used for obtaining a preset number of display partitions.

At step S302, the brightness of the first light source is set to be the same as brightness of the display partition with a maximum brightness among the plurality of display partitions of the image frame to be displayed.

In the present embodiment, setting of the brightness can be achieved by assigning a value to the brightness of the display partition with the maximum brightness in the image frame to be displayed, or setting of the brightness can be achieved by adjusting in a preset adjustment manner to the brightness of the display partition with the maximum brightness in the image frame to be displayed.

It can be understood that after the display partition with the maximum brightness in the image frame to be displayed is obtained, the brightness of the light field formed by the cooperation of the current first light source and second light source can be obtained.

At step S303, the brightness of the first light source is gradually decreased until a sum of at least one difference is equal to brightness of the second light source, where each of the at least one difference is a difference between brightness of one display partition having brightness greater than the brightness of the first light source among the plurality of display partitions of the image frame to be displayed and the brightness of the first light source.

In the present embodiment, by gradually decreasing the brightness of the first light source, the brightness provided by the first light source properly meets the set conditions: the sum of the differences between the brightness of display partitions greater than the brightness of the first light source and the brightness of the first light source is equal to the brightness of the second light source.

At step S304, according to the brightness of the first light source and the image information of the image frame to be displayed, light steering is performed on the second light source to from the second light field.

In the present embodiment, after the brightness of the first light source is determined at step S303, the modulation data used for performing light steering on the second light source can be determined based on the brightness of the first light source, and then the light steering and modulation are performed on the light provided by the second light source using the modulation data to obtain the desired second light field. The desired second light filed can be the superposition of the brightness of the first light field of the first light source and the second light field of the second light source, and the superposition can exactly restore the brightness of the image frame to be displayed; or the desired second light filed can be the superposition of the brightness of the first light field of the first light source and the second light field of the second light source, and the superposition is within the brightness restoration requirement range for restoring the image frame to be displayed.

In the present embodiment, firstly, the brightness of the first light source is set to the maximum brightness corresponding to the maximum brightness partition of the image frame to be displayed, and then the brightness is adjusted in a gradually-decreasing manner, and the brightness provided by the first light source satisfies that the sum of the differences between the brightness of the display partitions with brightness greater than the brightness of the first light source among the plurality of display partitions of the image frame to be displayed and the brightness of the first light source is equal to the brightness of the second light source. Finally, the obtained brightness of the first light source and the brightness provided by the second light source cooperate to satisfy the displaying of each display partition of the image frame to be displayed, thereby realizing the brightness cooperation of the first light source and the second light source.

Figure 4:
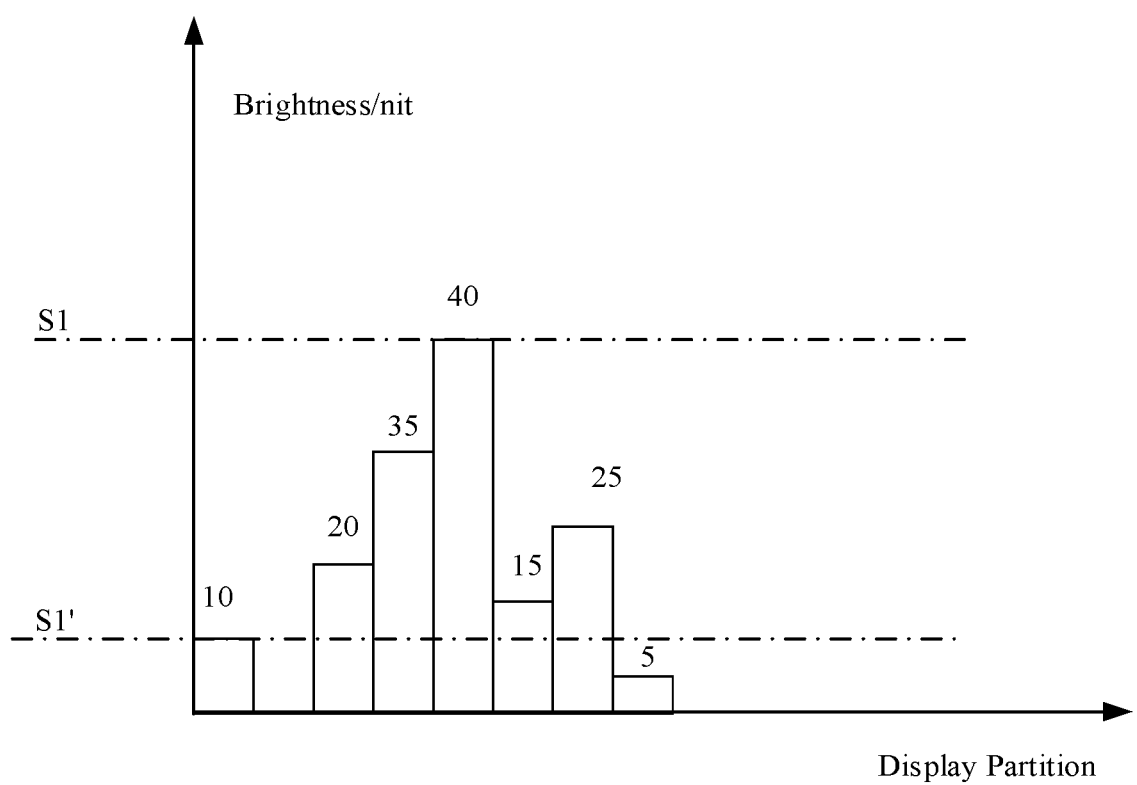
FIG. 4 is a schematic diagram showing brightness adjusting corresponding to the third embodiment.

Referring to FIG. 4, FIG. 4 is a schematic diagram showing brightness adjusting corresponding to the third embodiment. The brightness S2 of the second light source is a constant value of 85 nits, the acquired image information of the image frame to be displayed indicates that the display partitions include eight display partitions, and the brightness of the first display partition to the eighth display partition are respectively 10 nits, 0 nit, 20 nits, 35 nits, 40 nits, 15 nits, 25 nits, and 5 nits.

The display partition with the maximum brightness is the fifth display partition having brightness of 40 nits. Therefore, the brightness S1 of the first light source is set to 40 nits correspondingly. Then, the brightness of the first light source is gradually decreased to satisfy that the sum of the differences between the brightness of the display partitions with brightness greater than the brightness of the first light source among the plurality of display partitions of the image frame to be displayed and the brightness of the first light source is equal to the brightness of the second light source.

In the present embodiment, when the brightness of the first light source is decreased to brightness S1', that is 10 nits, it is exactly satisfied that (20 nit−10 nit)+(35 nits−10 nits)+(40 nits−10 nits)+(15 nits−10 nits)+(25 nits−10 nits) =85 nits.

Figure 5:
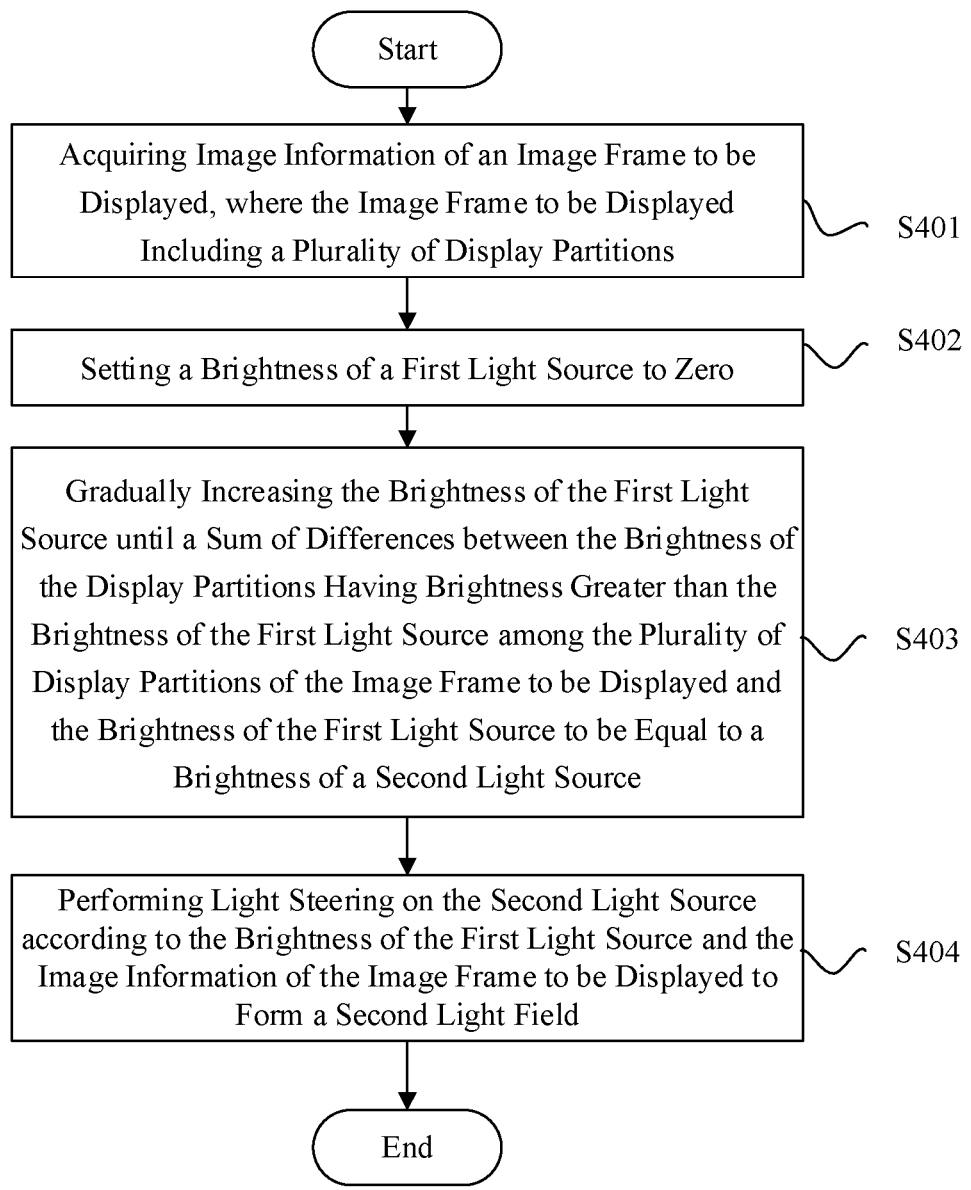
FIG. 5 is a flowchart of an image display method provided by a fourth embodiment of the present disclosure.

Please refer to FIG. 5, FIG. 5 is a flowchart of an image display method provided by a fourth embodiment of the present disclosure. The main difference between the present embodiment and the foregoing embodiments is that the present embodiment includes steps, such as a step of setting the brightness of the second light source to zero. It should be noted that, within the scope of the spirit or basic features of the present disclosure, the specific solutions applicable to the first embodiment can also be correspondingly applied to the present embodiment, which is no longer repeated here for saving space and avoiding repetition.

The image display method shown in FIG. 5 can be applied to a projection apparatus and a projection device including the projection apparatus. As shown in FIG. 5, the image display method can include the following steps.

At step S401, image information of an image frame to be displayed is acquired, where the image frame to be displayed includes a plurality of display partitions.

At step S402, brightness of a first light source is set to zero.

It can be understood that when the brightness of the first light source is zero, the state of the first light source can be the turned-off state.

At step S403, the brightness of the first light source is gradually increased until a sum of differences between the brightness of the display partitions with brightness greater than the brightness of the first light source among the plurality of display partitions of the image frame to be displayed and the brightness of the first light source is equal to brightness of the second light source.

In the present embodiment, by gradually increasing the brightness of the first light source, the brightness provided by the first light source exactly meets the set conditions: the sum of the differences between the brightness of display partitions greater than the brightness of the first light source and the brightness of the first light source is equal to the brightness of the second light source.

At step S404, according to the brightness of the first light source and the image information of the image frame to be displayed, light steering is performed on the second light source to from the second light field.

In the present embodiment, after the brightness of the first light source is determined at step S403, the modulation data for performing the light steering on the second light source can be determined based on the brightness of the first light source similarly, and then light steering and modulation are performed on the light provided by the second light source using the modulation data to obtain the desired second light field. The desired second light filed can be the superposition of the brightness of the first light field of the first light source and the second light field of the second light source, and the superposition can exactly restore the brightness of the image frame to be displayed; or the desired second light filed can be the superposition of the brightness of the first light field of the first light source and the second light field of the second light source, and the superposition is within the brightness restoration requirement range for restoring the image frame to be displayed.

Compared with the third embodiment, in the present embodiment, firstly, the brightness of the first light source is set to zero, and then the brightness is adjusted in a gradually-increasing manner, and the brightness provided by the first light source satisfies that the sum of the differences between the brightness of the display partitions with brightness greater than the brightness of the first light source among the plurality of display partitions of the image frame to be displayed and the brightness of the first light source is equal to the brightness of the second light source. Finally, the obtained brightness of the first light source and the brightness provided by the second light source cooperate to satisfy the displaying of each display partition of the image frame to be displayed, thereby realizing the brightness cooperation of the first light source and the second light source.

Figure 6:
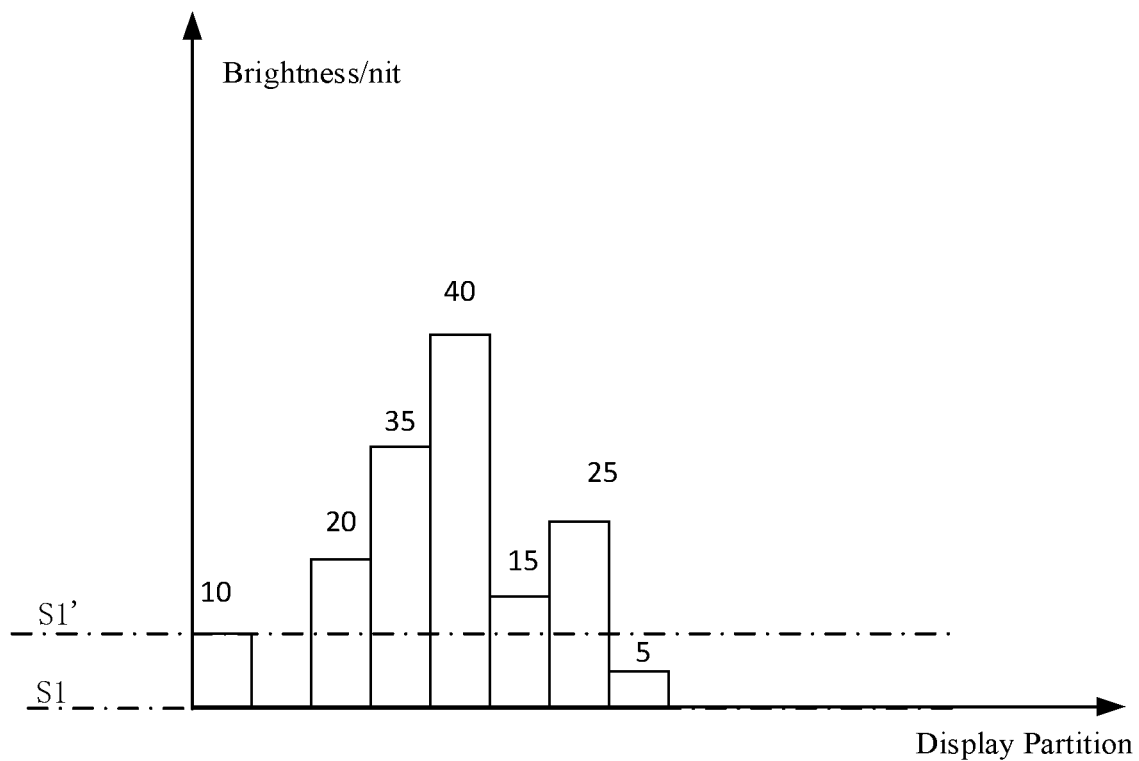
FIG. 6 is a schematic diagram showing brightness adjusting corresponding to the fourth embodiment.

Refer to FIG. 6, FIG. 6 is a schematic diagram showing brightness adjusting corresponding to the fourth embodiment. The brightness S2 of the second light source is a constant value of 85 nits, the acquired image information of the image frame to be displayed indicates that the display partitions include eight display partitions, and the brightness of the first display partition to the eighth display partition are respectively 10 nits, 0 nit, 20 nits, 35 nits, 40 nits, 15 nits, 25 nits, and 5 nits.

The display partition with the maximum brightness is the fifth display partition having brightness of 40 nits. Therefore, when the brightness S1 of the first light source is adjusted from zero to the brightness S1' of 10 nits, it is exactly satisfied that (20 nit−10 nit)+(35 nits−10 nits)+(40 nits−10 nits)+(15 nits−10 nits)+(25 nits−10 nits)=85 nits.

Figure 7:
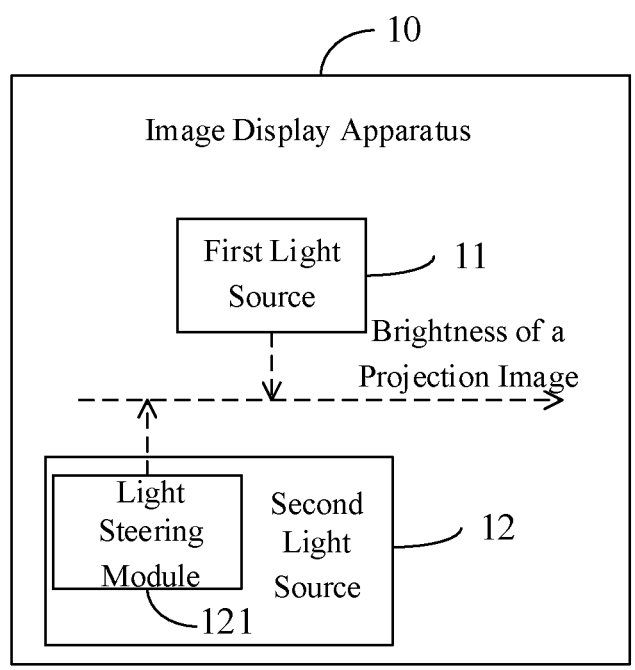
FIG. 7 is a schematic diagram of an image display apparatus provided by an embodiment of the present disclosure.

Referring to FIG. 7, FIG. 7 is a schematic block diagram of an image display apparatus provided by an embodiment of the present disclosure. As shown in FIG. 7, an image display apparatus 100 shown in FIG. 7 can include a first light source 11 and a second light source 12. The brightness of the first light source 11 is adjusted according to image information of an image frame to be displayed and the brightness of the second light source 12, to provide a first light field.

The second light source 12 includes a light steering module 121 configured to perform light steering on the second light source according to the image information of the image frame to be displayed to form a second light field, such that a first light field provided by the first light source and the second light field provided by the second light source cooperate to satisfy displaying of each display partition of the image frame to be displayed.

In the present embodiment, the division of the display partition of the image frame to be displayed corresponds to the distribution position of the light field generated after the modulation of the light steering module 121. When it is necessary to restore the brightness of the display partition of the image frame to be displayed, it can also make it corresponding to the modulated brightness.

It can be understood that the image display apparatus of the present embodiment can further include a control module electrically connected to the first light source. When the brightness of the second light source can satisfy the displaying of the image frame to be displayed, the control module turns off the first light source to reduce the power consumption.

In the present embodiment, the light steering module can be a phase modulation liquid crystal device or a deformable mirror.

It can be understood that the present disclosure further provides a projection device, and the projection device includes the image display apparatus of the present embodiment. Further, the projection device can further include a light combiner, and the light combiner is configured to steer the first light field of the first light source and the second light field of the second light source that are obtained according to the embodiment of the image displaying method, to propagate a same light path to obtain composite illumination light.

Figure 8:
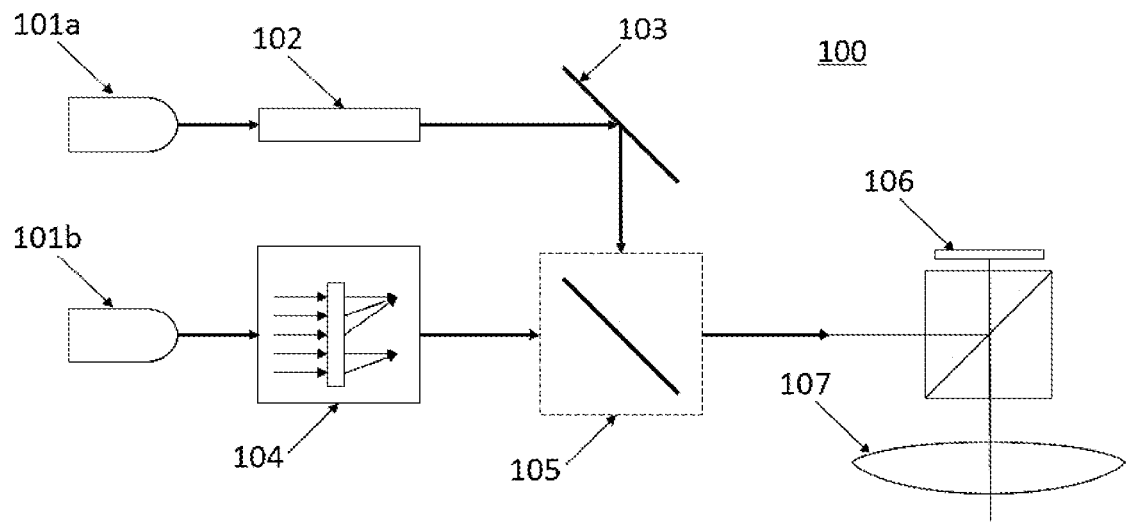
FIG. 8 is a schematic diagram of a projection device provided by a first embodiment of the present disclosure.

Further, the projection device can further include a spatial light modulator, and the spatial light modulator is configured to modulate the composite illumination light according to the image information of the image frame to be displayed to output image light to be projected. The outputted projection image light can be emitted through a projection lens to achieve a certain degree of reproduction of the image frame to be displayed Referring to FIG. 8, FIG. 8 is a schematic diagram of a projection device provided by a first embodiment of the present disclosure. The projection device 100 includes a light source system, a spatial light modulator 106, and a projection lens 107. The light source system can include a first light source 101a and a second light source 101b. The brightness of the first light source 101a can be adjusted according to the image information of the image frame to be displayed and the brightness of the second light source, and specifically, it can be a laser light source, a laser fluorescent light source, or a light emitting diode light source. In present embodiment, first illumination light emitted by the first light source 101a can be subjected to light homogenization processing by a light homogenization device 102, so as to achieve uniform light distribution of the first illumination light. The homogenized first illumination light has a first light field.

The second light source 101b emits second illumination light at a preset light source power, and the brightness of the second illumination light is a constant value. The second illumination light is modulated by a light steering device 104 to obtain modulated illumination light having a second light field, such that the first light field provided by the first light source 101a and the second light field provided by the second light source cooperate to satisfy displaying of each display partition of the image frame to be displayed. It should be understood that the second illumination light is a constant value, and after the light steering and modulation that are performed by the light steering device, the total light brightness of each brightness distribution is still a constant value and not changed.

Specifically, the image frame to be displayed can be divided into 30×40 display partitions, and brightness statistics of each display partition can be performed. The second light field modulated by the light steering device 104 also has a brightness distribution corresponding to 30×40 display partitions.

The first illumination light that has been homogenized by the light homogenization device 102 is reflected to a light combiner 105 by a mirror 103, and the modulated illumination light generated by the light steering device 104 also propagates to the light combiner 105. The light combiner 105 steers the received first illumination light and the modulated illumination light to the same light path to propagate to obtain composite illumination light.

In the present embodiment, when the light combiner 105 is a polarization combiner, the first illumination light emitted by the first light source 101a is S-polarized light, and the modulated illumination light obtained by modulating the second illumination light emitted by the second light source 101b is P-polarized light.

In the present embodiment, when the light combiner 105 is a wavelength light combiner, both a wavelength difference between the first illumination light and the second illumination light and a wavelength difference between the first illumination light and the modulated illumination light obtained by modulation are 10 nanometers. For example, when the wavelength of the first illumination light is 455 nanometers, the wavelength of the second illumination light and the wavelength of the modulated illumination light are 465 nanometers.

The composite illumination light obtained by the light combiner 105 is transmitted to the spatial light modulator 106, and the spatial light modulator 106 modulates the composite illumination light according to the image information of the image frame to be displayed, so as to obtain the to-be-projected image light that will be projected by the projection lens 107. After the to-be-projected image light is projected by the projection lens 107, a visible image can be formed on an image receiving surface such as a screen. Here, the spatial light modulator 106 is a digital micromirror.

In the present embodiment, the first light source 101a and the second light source 101b are adjusted according to the acquired image information of the image frame to be displayed, so that the first light field provided by the first light source 101a and the second light field provided by the second light source 101b can satisfy the displaying of each display partition of the image frame to be displayed. The composite illumination light can include background illumination light which is provided by the first light source 101a and used for the basic brightness of the image frame to be displayed, and can also include the compensation illumination light which is provided by the second light source 101b and is used for the high-brightness area of the image frame to be displayed, which is beneficial to realize the global dimming effect of the projection image and beneficial to the detail expression of the dark field of the projection image, and at the same time, it can also achieve image effects of high-brightness and high dynamic range to enhance the visual effect.

Figure 9:
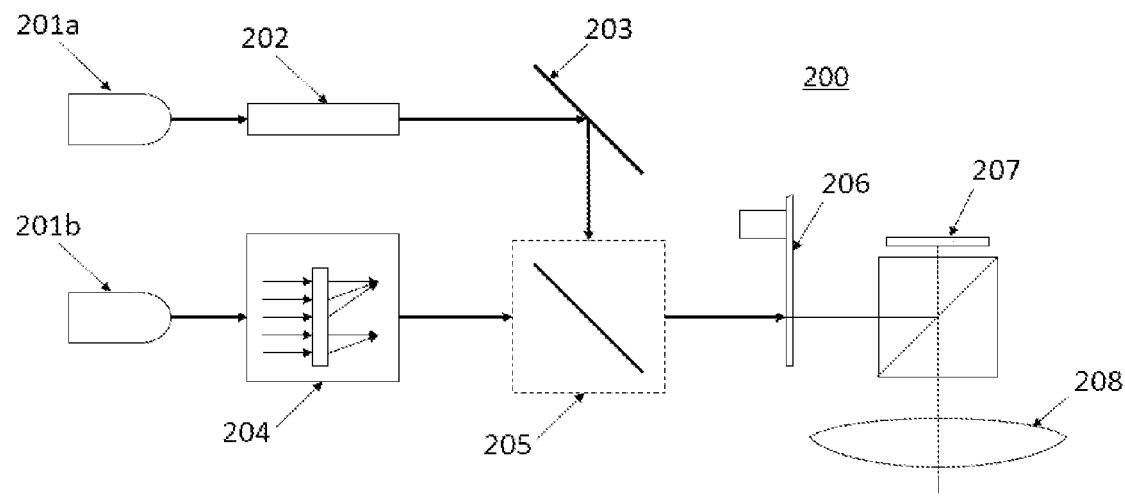
FIG. 9 is a schematic diagram of a projection device provided by a second embodiment of the present disclosure.

Referring to FIG. 9, FIG. 9 is a schematic diagram of a projection device provided by a second embodiment of the present disclosure. A projection device 200 includes a light source system, a phosphor color wheel 206, a spatial light modulator 207, and a projection lens 208. In the light source system, a first light source 201a and a second light source 201b are both blue laser light sources, the light source power of the first light source 201a is greater than the light source power of the second light source 201b, and the brightness provided by the first light source 201a and the brightness provided by the second light source 201b are determined according to image information of an image frame to be displayed. First illumination light emitted by the first light source 201a is used for providing background illumination light of the image frame to be displayed, and second illumination light emitted by the second light source 201b is used for providing compensation illumination light for the high-brightness area in the image frame to be displayed.

After the first illumination light emitted by the first light source 201a is homogenized by a light homogenization device 202, the first illumination light is reflected by a mirror 203 to a light combiner 205, the second illumination light emitted by the second light source 201b is steered and modulated by a light steering device 204 to obtain modulated illumination light, and the modulated illumination light is transmitted to a light combiner 205. The light combiner 205 steers the received first illumination light and the modulated illumination light to the same light path to obtain composite illumination light. It can be understood that since the first light source 201a and the second light source 201b are both blue laser light sources, the illumination light processed by the light homogenization device 202 and the light steering device 204 is still blue laser illumination light.

In the present embodiment, a phosphor color wheel 206 is provided on the light path of the composite illumination light, and the phosphor color wheel 206 is configured to convert the composite illumination light to obtain the three primary colors composite illumination light, and is specifically configured to convert the blue laser illumination light into red illumination light, green illumination light, and blue illumination light. Here, the red illumination light and the green illumination light are both fluorescence illumination light, and the blue illumination light is fluorescence illumination light or laser illumination light. If the blue illumination light is fluorescence illumination light, the phosphor color wheel is provided with a corresponding blue light conversion area; if the blue illumination light is laser illumination light, the phosphor color wheel can be provided with a corresponding blue light-transmissive area or blue light reflection area.

The red illumination light, the green illumination light, and the blue illumination light that are obtained by the phosphor color wheel 206 are transmitted to the spatial light modulator 207, and the spatial light modulator 207 modulates the received illumination light according to the image information of the image frame to be displayed so as to obtain the to-be-projected image light that will be projected by the projection lens 208.

In the present embodiment, the spatial light modulator 207 can be a single-sheet digital micromirror or a three-sheet digital micromirror.

When the spatial light modulator 207 is a single-sheet digital micromirror, the phosphor color wheel 206 is an RGB segmented color wheel, so for each image frame to be displayed, it needs to project the red light of the image frame to be displayed, the green light of the image frame to be displayed, and the blue light of the image frame to be displayed in three periods of red, green, and blue, respectively. Next, by using the visual persistence effect of the naked eyes, a color image is formed on the human senses, and in the light source system, for each image frame to be displayed, it only needs to adjust the power once, which saves computing resources.

When the spatial light modulator 207 is a three-sheet digital micromirror, for each image frame to be displayed, the red light of the image to be projected, the green light of the image to be projected, and the blue light of the image to be projected can be projected in the same period, and they are directly combined into a color image that can be directly observed by the naked eye.

Figure 10:
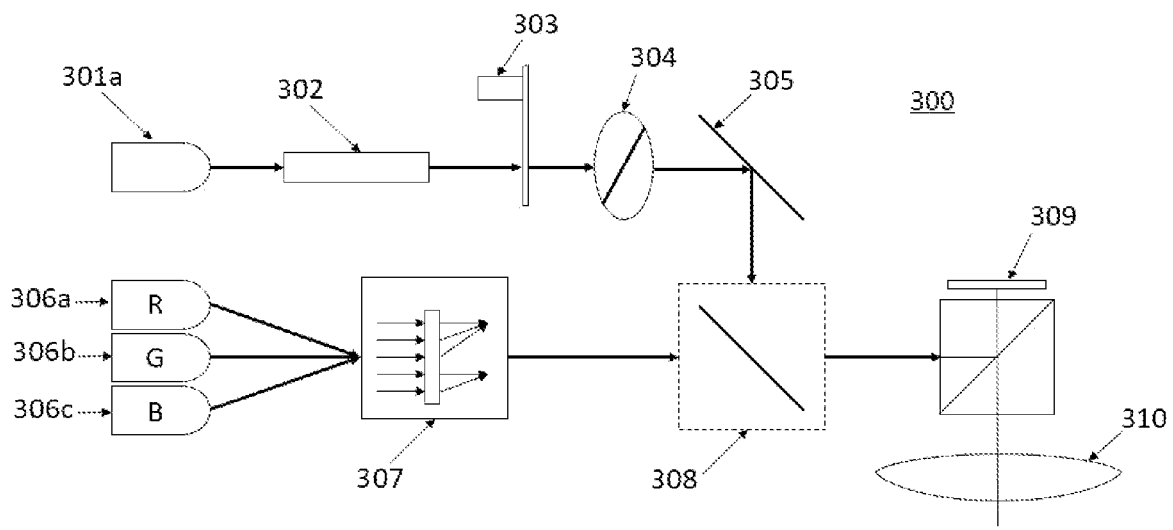
FIG. 10 is a schematic diagram of a projection device provided by a third embodiment of the present disclosure.

Referring to FIG. 10, FIG. 10 is a schematic diagram of a projection device provided by a third embodiment of the present disclosure. A projection device 300 includes a light source system, a spatial light modulator 309, and a projection lens 310. The light source system further includes a first light source 301a and a light homogenization device 302 for homogenizing first illumination light emitted by the first light source 301a. The homogenized first illumination light is irradiated on a phosphor color wheel 303, and the phosphor color wheel 303 converts the received illumination light into fluorescence illumination light of the corresponding color (such as three primary colors fluorescence illumination light in time division). Next, a polarization conversion system 304 performs polarization conversion processing on the fluorescence illumination light to obtain fluorescence illumination light with linear polarization. Here, a light combiner 308 is a polarization combiner, so the fluorescence illumination light generated by the conversion of the phosphor color wheel 303 is converted, by the polarization conversion system 304, into illumination light with linear polarization.

At the same time, the second light source includes a red laser 306a, a green laser 306b, and a blue laser 306c that are turned on in a time division manner to generate color light synchronizing with the three primary colors fluorescence illumination light (the aforementioned first illumination light) generated by the phosphor color wheel 303. Next, a light steering device 307 performs light steering and modulation on each of the three primary colors illumination light (the aforementioned second illumination light) to obtain the three primary colors modulated illumination light. Next, the light combiner 308 steers the three primary colors fluorescence illumination light and the three primary colors modulated illumination light to the same light path to propagate, to the spatial light modulator 309.

In the present embodiment, according to the image information of the image frame to be displayed and the brightness of the red laser 306a, the green laser 306b and the blue laser 306c of the second light source, the first light source 301a is adjusted to obtain the first illumination light having a first light field. The light steering device 307 performs light steering and modulation on the illumination light emitted by lasers to form various colors of modulated illumination light that each has a second light field. The modulated illumination light and the first illumination light can cooperate to still satisfy the displaying of each display partition of the image frame to be displayed.

In the present embodiment, the phosphor color wheel 303 is a wavelength conversion device that can convert the first illumination light emitted by the first light source 301a into red fluorescence illumination light and green fluorescence illumination light that provide the DCI P3 color gamut. The laser emitted by the red laser 306a, the green laser 306b, and the blue laser 306c of the second light source is the illumination light for providing the REC2020 color gamut, thereby enhancing the color gamut of the projection image and improving the color expression of the projection image.

After receiving the corresponding-color fluorescence and the modulated illumination light, the spatial light modulator 309 modulates the corresponding-color fluorescence and the modulated illumination light according to the image information of the image frame to be displayed, to obtain the to-be-projected image light to be projected by the projection lens 310. It can be understood that the spatial light modulator 309 here is a digital micromirror.

Figure 11:
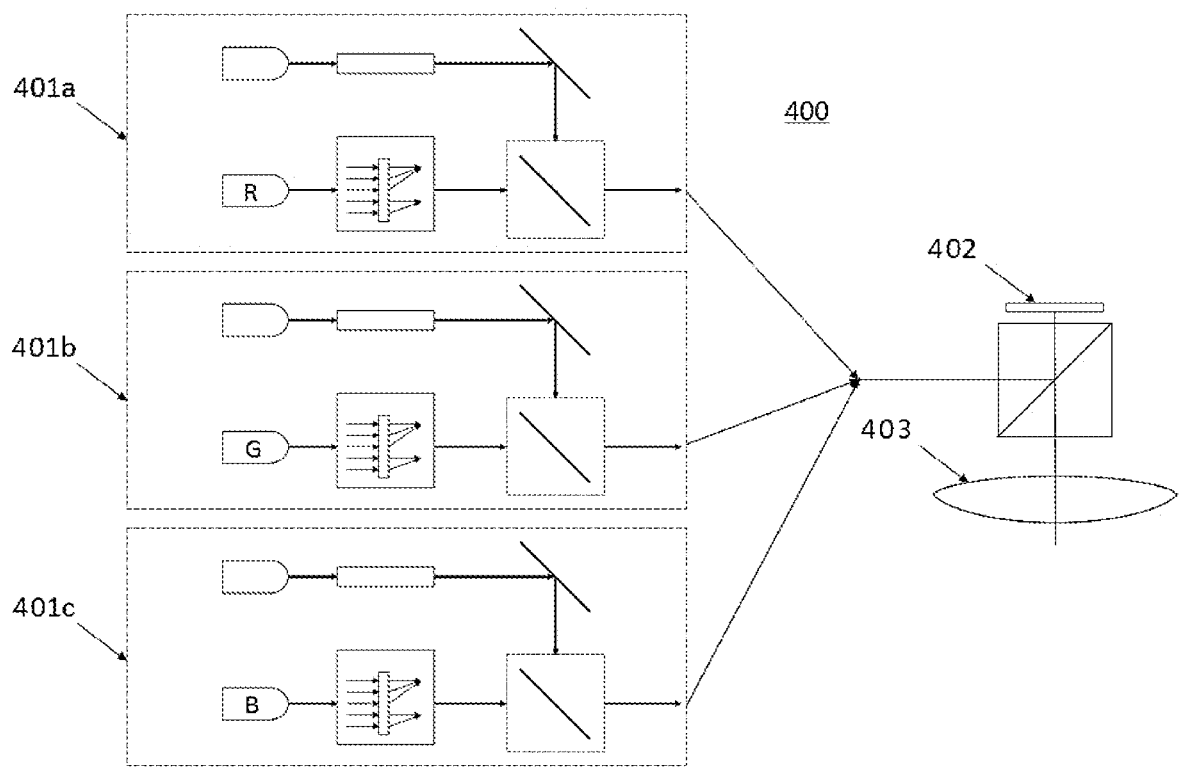
FIG. 11 is a schematic diagram of a projection device provided by a fourth embodiment of the present disclosure.

Referring to FIG. 11, FIG. 11 is a schematic diagram of a projection device provided by a fourth embodiment of the present disclosure. In the present embodiment, a projection device 400 includes three light source systems, a spatial light modulator 402, and a projection lens 403. The light source systems are configured to generate composite illumination light having various colors. For example, a red-light light source system 401a is configured to generate red composite illumination light, a green-light light source system 401b is configured to generate green composite illumination light, and a blue-light light source system 401c is configured to generate blue composite illumination light. The generated red composite illumination light, green composite illumination light, and blue composite illumination light are emitted to the spatial light modulator 402 in a timing sequence. Next, the spatial light modulator 402 modulates the corresponding illumination light according to the image information of the image frame to be displayed so as to obtain the to-be-projected image light that will be projected by the projection lens 403.

In the present embodiment, the first light source of each light source system can be a laser light source of the same specification, and the first illumination light generated by the first light source is homogenized by a light homogenization device, and a mirror is provided to reflect the homogenized first illumination light to a light combiner in the light source system. The second light source of each light source system can be a laser light source with the same power, and only the color of the emitted laser light is different. The second illumination light emitted by the laser light source of each color can be modulated by the light steering devices of the same specification to generate the modulated illumination light of the corresponding color. Then, with the light combiner, the corresponding red composite illumination light, green composite illumination light and blue composite illumination light are generated.

It can be understood that in each light source system, the first light field provided by the first light source and the second light field provided by the second light source of the corresponding color cooperate to satisfy the displaying of each display partition of the image frame to be displayed.

Of course, when the spatial light modulator 402 is a three-sheet digital micromirror, each digital micromirror can modulate the composite illumination light of one color, such that the to-be-projected image light of various colors are generated and are projected by the projection lens 403 simultaneously. In this way, the color image that can be viewed by the naked eye is directly generated.

In summary, when the projection system provided by the present disclosure applies the image display method provided by the present disclosure, by using the acquired image information of the image frame to be displayed, the brightness of the first light source is adjusted to obtain the first light field, and at the same time, the light steering is performed on the second light source to obtain the second light field. The adjusted first light field and the second light field cooperate to satisfy the displaying of each display partition of the image frame to be displayed. The satisfying the displaying of each display partition of the image frame to be displayed can indicate satisfying the display brightness of each display partition of the image frame to be displayed, or can indicates satisfying the display brightness of each display partition of the image frame to be displayed in a specific brightness. Since the first light source and the second light source that are relatively independent from each other cooperate to provide the brightness, the brightness provided by the first light source and/or the brightness provided by the second light source can be selectively adjusted according to the image information of the image frame to be displayed, which can reasonably save energy, provide image display light of the specific brightness, relatively increase the provided brightness range, realize the display of high dynamic range images, and improve the detail expression of dark field of the image to be displayed.

The above descriptions illustrate the various embodiments of the present invention, and do not limit the scope of the invention. Equivalent structures or processes based on the disclosure of this specification and drawings, or their direct or indirect applications in other related technology areas, are within the scope of protection of this invention.

What is claimed is:

1. An image display method, comprising:
   acquiring image information of an image frame to be displayed, wherein the image frame to be displayed comprises a plurality of display partitions; and
   based on the image information of the image frame to be displayed, adjusting brightness of a first light source having a first light field, and performing light steering on a second light source to form a second light field, so as to enable the first light field provided by the first light source and the second light field provided by the second light source to cooperate to satisfy displaying of each of the plurality of display partitions of the image frame to be displayed.

2. The image display method of claim 1, wherein said based on the image information of the image frame to be displayed, adjusting the brightness of the first light source having the first light field, and performing light steering on the second light source to form the second light field, comprises:
   determining whether brightness of the second light source satisfies displaying of the image frame to be displayed; and
   if the brightness of the second light source does not satisfy the displaying of the image frame to be displayed, turning on the first light source, and based on the image information of the image frame to be displayed, adjusting the brightness of the first light source having the first light field, and performing light steering on the second light source to form the second light field.

3. The image display method of claim 2, wherein
   if the brightness provided by the second light source satisfies the displaying of the image frame to be displayed, the first light source is not turned on.

4. The image display method of claim 3, wherein the brightness of the second light source is a constant value; and further comprising:
   if the brightness provided by the second light source satisfies the display of the image frame to be displayed, and light steering is performed in a preset manner so as to distribute a remaining brightness value of the second light source after satisfying the displaying of the image frame to be displayed to the plurality of display partitions of the image frame to be displayed.

5. The image display method of claim 2, wherein the brightness of the second light source is a variable value; and
   if the brightness provided by the second light source satisfies the displaying of the image frame to be displayed, the first light source is not turned on, and the brightness of the second light source is adjusted according to a sum of brightness of the plurality of display partitions of the image frame to be displayed.

6. The image display method of claim 1, wherein said based on the image information of the image frame to be displayed, adjusting the brightness of the first light source having the first light field, and performing light steering on the second light source to form the second light field, comprises:
   setting the brightness of the first light source to be equal to brightness of one display partition with a maximum brightness among the plurality of display partitions of the image frame to be displayed;
   gradually decreasing the brightness of the first light source until a sum of at least one difference is equal to brightness of the second light source, wherein the at least one difference includes a difference between brightness of each of those display partitions having brightness greater than the brightness of the first light source among the plurality of display partitions of the image frame to be displayed and the brightness of the first light source; and
   performing light steering on the second light source according to the brightness of the first light source and the image information of the image frame to be displayed to from the second light field.

7. The image display method of claim 6, wherein performing light steering on the second light source based on the brightness of the first light source and the image information of the image frame to be displayed to from the second light field, comprises:
   based on the brightness of the first light source and the image information of the image frame to be displayed, determining a modulation data used for performing light steering on light emitted by the second light source;
   performing light steering on light emitted by the second light source by using the modulation data to obtain the desired second light field, so that the superposition of the brightness of the first light field of the first light source and the second light field of the second light source can restore the brightness of the image frame to be displayed.

8. The image display method of claim 1, wherein said based on the image information of the image frame to be displayed, adjusting the brightness of the first light source having the first light field, and performing light steering on the second light source to form the second light field, comprises:
setting the brightness of the first light source to zero;
gradually increasing the brightness of the first light source until a sum of at least one difference is equal to brightness of the second light source, wherein the at least one difference includes a difference between brightness of each of those display partitions having brightness greater than the brightness of the first light source among the plurality of display partitions of the image frame to be displayed and the brightness of the first light source; and
performing light steering on the second light source according to the brightness of the first light source and the image information of the image frame to be displayed to from the second light field.

9. The image display method of claim 8, wherein performing light steering on the second light source based on the brightness of the first light source and the image information of the image frame to be displayed to from the second light field, comprises:
based on the brightness of the first light source and the image information of the image frame to be displayed, determining a modulation data used for performing light steering on light emitted by the second light source;
performing light steering on light emitted by the second light source by using the modulation data to obtain the second light field, so that the superposition of the brightness of the first light field of the first light source and the second light field of the second light source can restore the brightness of the image frame to be displayed.

10. The image display method of claim 1, wherein brightness of the second light source is a maximum of brightness values that the second light source provides or a preset brightness value.

11. An image display apparatus, comprising a first light source, a second light source, and a light steering module, wherein the first light source is configured to emit first illumination light having a first light field, brightness of the first light field is adjusted based on image information of an image frame to be displayed and brightness of the second light source;
wherein the second light source is configured to emit second illumination light; and
wherein the light steering module configured to perform light steering on the second illumination light based on the image information of the image frame to be displayed to form a second light field, such that a first light field provided by the first light source and the second light field provided by the second light source cooperate to satisfy displaying of each of a plurality of display partitions of the image frame to be displayed; and
wherein the image frame to be displayed are divided into the plurality of display partitions in such a manner to match the light steering module of the second light source.

12. The image display apparatus of claim 11, further comprising:
a control module electrically connected to the first light source, wherein when the brightness of the second light source satisfies displaying of the image frame to be displayed, the control module controls to turn off the first light source.

13. The image display apparatus of claim 11, wherein the light steering module is a phase modulation liquid crystal device or a deformable mirror.

14. A projection device, comprising a light source system, wherein the light source system comprises a first light source, a second light source, a light steering device and a light combiner, wherein:
the first light source is configured to emit first illumination light having a first light field, wherein brightness of the first light field is adjusted based on image information of an image frame to be displayed and brightness of the second light source, wherein the image frame to be displayed comprises a plurality of display partitions;
the second light source is configured to emit second illumination light;
the light steering module is configured to modulate the second illumination light to obtain modulated illumination light having a second light field, wherein the second light field modulated by the light steering device has a brightness distribution corresponding to the display partitions;
the light combiner is configured to steer the first light field and the second light field to the same light path to propagate to obtain composite illumination light.

15. The projection device of claim 14, further comprising:
a spatial light modulator configured to modulate, according to the image information of the image frame to be displayed, the composite illumination light to output image light to be projected.

16. The projection device of claim 14, wherein the light source system further comprises a light homogenization device, the light homogenization device is located on light path of the first illumination light and is configured to achieve uniform light distribution of the first illumination light to obtain the first light field.

17. The projection device of claim 14, further comprising a phosphor color wheel, the phosphor color wheel is located on light path of the composite illumination light and is configured to convert the composite illumination light to obtain the three primary colors composite illumination light.

18. The projection device of claim 14, further comprising a phosphor color wheel, the phosphor color wheel is located on light path of the first illumination light and is configured to convert the first illumination light into fluorescence illumination light, and
the second light source includes a first laser, a second laser, and a third laser that are turned on in a time division manner to generate color light synchronizing with the three primary colors fluorescence illumination light generated by the phosphor color wheel.

19. The projection device of claim 14, further comprising a first light source system, a second light source system, and a third light source system, wherein:
the first light source system is configured to generate composite illumination light having first color, the second light source system is configured to generate composite illumination light having second color, the third light source system is configured to generate composite illumination light having third color, and the composite illumination light having first color, the composite illumination light having second color and the composite illumination light having third color are configured to emitted to the spatial light modulator in a timing sequence.

\* \* \* \* \*